United States Patent [19]

Tran

[11] Patent Number: 5,672,288

[45] Date of Patent: Sep. 30, 1997

[54] LIGHT SENSITIVE CONTROL FOR TOASTER

[75] Inventor: Duc Hoang Tran, Shelton, Conn.

[73] Assignee: Black & Decker Inc., Newark, Del.

[21] Appl. No.: 700,180

[22] Filed: Aug. 19, 1996

[51] Int. Cl.[6] ...................................................... H05B 1/02
[52] U.S. Cl. ........................... 219/502; 219/501; 219/518; 219/519; 219/497; 219/505; 99/329 R
[58] Field of Search ............................ 219/502, 492, 219/494, 497, 499, 501, 503, 506, 518, 519; 99/329 R, 328, 329 P, 385, 329 RT

[56] References Cited

U.S. PATENT DOCUMENTS

| | | |
|---|---|---|
| 2,631,523 | 4/1953 | Olving ........................................ 99/326 |
| 3,062,941 | 11/1962 | White .......................................... 219/20 |
| 3,449,629 | 6/1969 | Wigert et al. ............................... 315/151 |
| 3,603,957 | 9/1971 | Merchant .................................... 340/258 |
| 3,700,933 | 10/1972 | Harkenride et al. ....................... 307/310 |
| 4,369,354 | 1/1983 | Goedecke et al. ......................... 219/506 |
| 4,574,801 | 3/1986 | Manes ..................................... 128/303.14 |
| 4,687,909 | 8/1987 | Eichler et al. .............................. 219/502 |
| 4,734,553 | 3/1988 | Noda ........................................ 219/10.55 |
| 4,901,506 | 2/1990 | Weyandt ...................................... 53/479 |
| 5,402,708 | 4/1995 | Krasznai et al. ............................. 99/328 |

*Primary Examiner*—Mark H. Paschall
*Attorney, Agent, or Firm*—Barry E. Deutsch

[57] ABSTRACT

In a toaster, a system is constructed to vary the duration of the toasting cycle. An RC network provides an oscillating signal to a counter, which upon the required number of oscillations being counted, triggers a transistor switch. The switch energizes the main solenoid switch which in turn deactivates the heating elements of the toaster. The RC network of the system comprises a variable resistor which may be manually operated, a heat sensitive resistor, and a light sensitive resistor.

7 Claims, 3 Drawing Sheets

LIGHT SENSITIVE CONTROL FOR TOASTER

BACKGROUND OF THE INVENTION

Most toasters are now electronically controlled and provide a more consistently toasted product then in the past. There are however still some significant problems in providing a sensitive control circuit which will provide the same degree of toasting on a repetitive basis. When a toaster is used for multiple toasting cycles with pauses in between of varying duration, the heat retention in the toaster will make the toast darker on subsequent cycles of use, forcing a continuous adjustment of the toaster.

The basic circuit of the control system used to adjust the toasting time consists of a power supply, an oscillator, a counter, and a transistor switch. This is used to activate an on/off solenoid switch which controls the power to the toaster heating elements. Adjustment is accomplished by varying the time constant of the oscillator. The oscillator is generally an RC network having a manually variable resistor. By raising the frequency of the oscillator the time in which the counter will respond and trigger the transistor switch is reduced.

A control system of the type designed to compensate for this situation is shown in U.S. Pat. No. 5,402,708. This system utilizes a heat sensitive resistor to monitor and react to the residual heat accumulated by repetitive toasting cycles. A thermistor is used which performs its task by reduction of its resistance as the heat increases. Since this is the resistor which forms part of the RC network, a reduced period for the oscillator results. This translates into a shorter toasting cycle.

The control system of the '708 patent is still subject to variations in the voltage to the heater elements and may not maintain toast color over continuous cycling. It also tends to overcompensate. It is the purpose of this invention to provide an improved control system for a toaster which is more sensitive to repetitive cycling and also to variations in the line voltage and wattage.

SUMMARY OF THE INVENTION

In a toaster, a system is constructed to vary the duration of the toasting cycle. An RC network provides an oscillating signal to a counter, which upon the required number of oscillations being counted, triggers a transistor switch. The switch energizes the main solenoid switch which in turn deactivates the heating elements of the toaster. The RC network of the system comprises a variable resistor which may be manually operated, a heat sensitive resistor, and a light sensitive resistor. The series of resistors control the time constant of the oscillator and allow it to be varied in response to diverse stimulus. The heat sensitive resistor is positioned to respond to the temperature of the heater element cavity. A high temperature glass tube is used to transmit light from the heating elements to the light sensitive resistor. In this manner an extremely sensitive control is provided which automatically compensates for repetitive cycling even with varying pauses between uses and also variations in the line voltage to the heating elements.

DESCRIPTION OF THE DRAWING

The invention is described in more detail below with reference to the attached drawing in which.

DESCRIPTION OF THE PREFERRED EMBODIMENT

Figure 1:
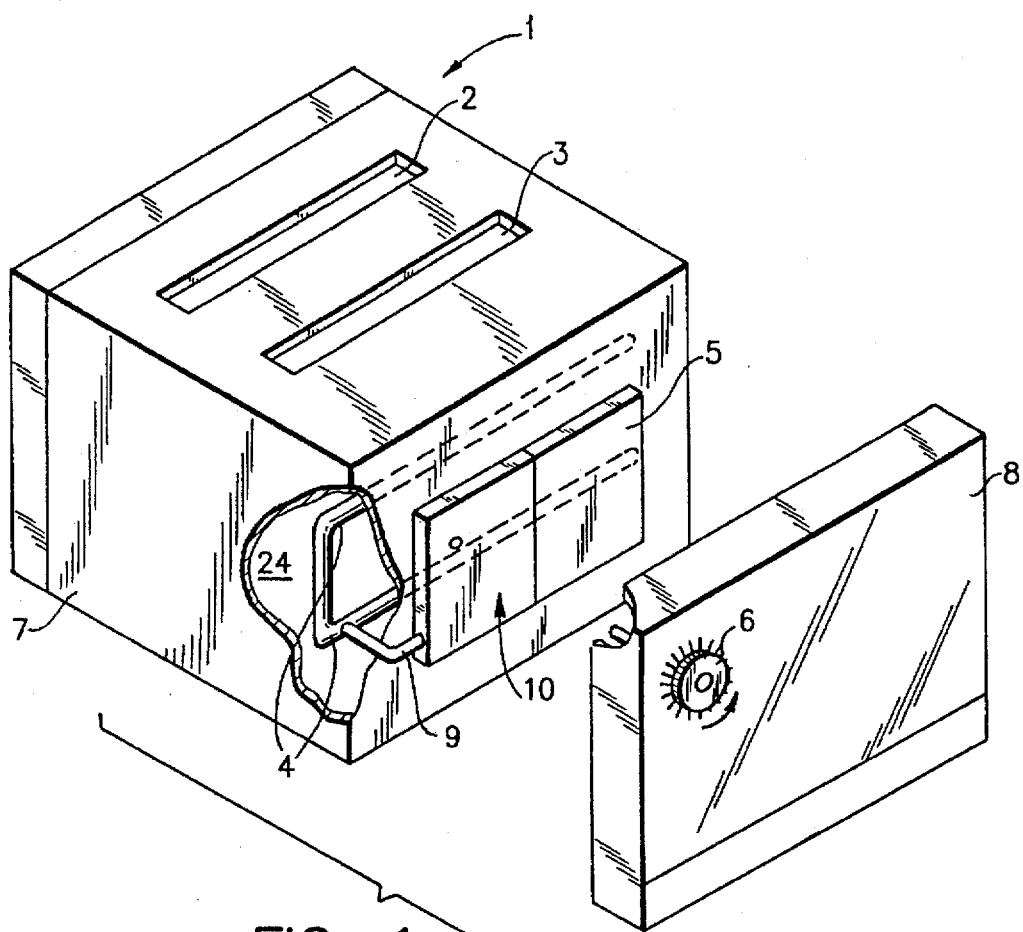
FIG. 1 is a perspective view of a toaster cut away to show the control of this invention.

As shown in FIG. 1, the toaster 1 of this invention is of conventional shape and is constructed with slots 2 and 3 for the insertion of bread or other pastry to be toasted. Calrod type heating elements 4 are mounted on either side of the slots 2 and 3 to heat and brown the toast. The workings and toast compartment 24 of the toaster 1 are contained in a housing 7 and an end cap 8 is removably secured to the housing 7 to enclose the control mechanism 5. A manual adjustment 6 is provided in operative connection to the control mechanism 5. The control mechanism 5 may include any conventional mechanical assembly for raising and lowering the toast and is operatively connected to the control system 10. A high temperature glass pipe is snaked through the housing adjacent to one of the calrod heaters 4 to receive light emitted from the heater element 4. The intensity of the light will reflect the level of voltage and wattage and also the presence of residual heat. The glass pipe 9 transmits the light from the heater element 4 to the light sensitive resistor 17 of oscillator 12.

Figure 2:
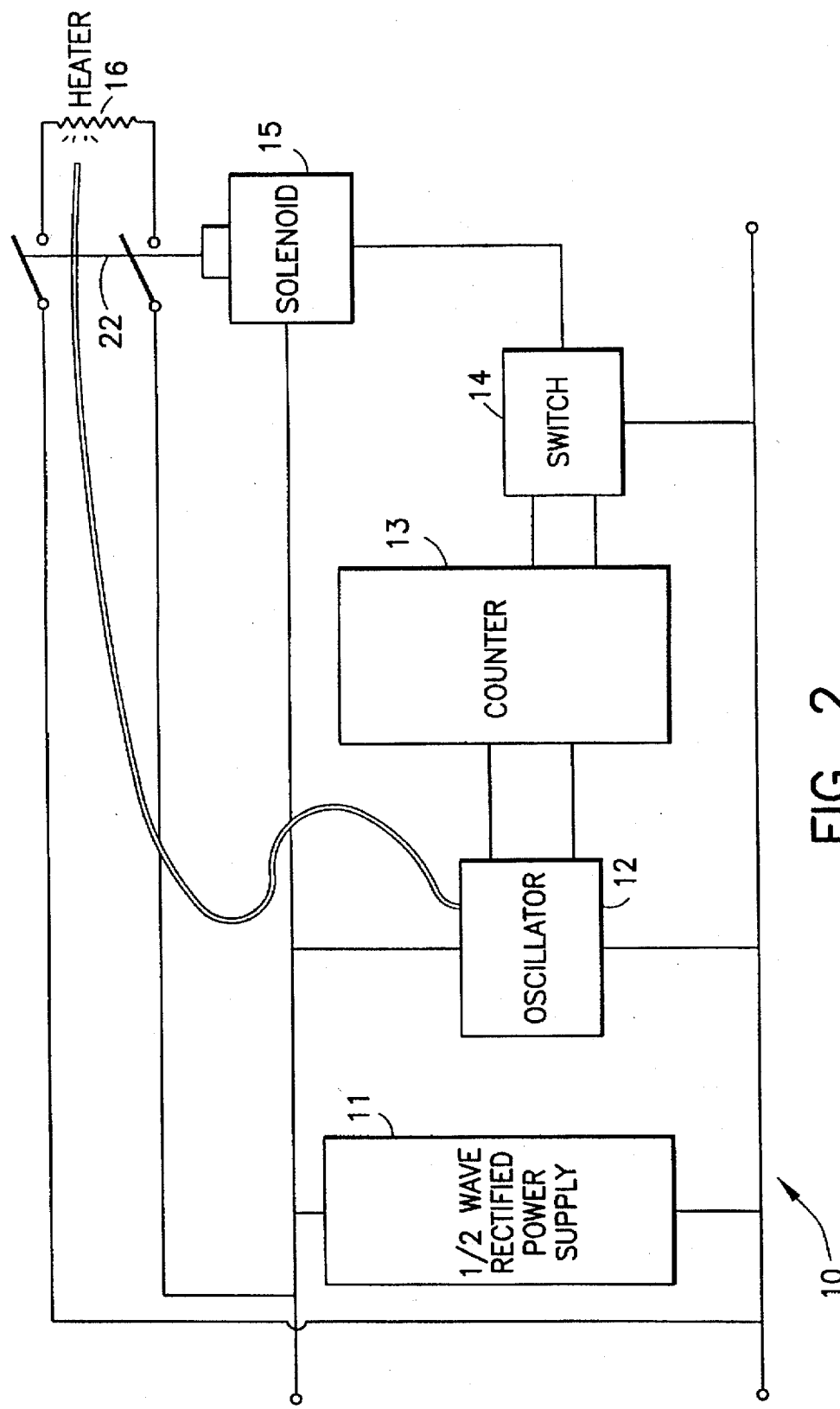
FIG. 2 is a block diagram of the control system of this invention.

Referring to FIG. 2, the control system 10 consists of a power supply circuit 11, an oscillator 12, a counter 13 and a transistor switching circuit 14. Switching circuit 14 directly controls the operation of a solenoid switch 15 which is associated with the main mechanical switch 22. The activation of the solenoid switch 15 applies the full supply voltage to the heater elements, generally 120 volts.

The purpose of the supply circuit 11 is to provide a low voltage, half wave rectified power to the control circuit and may consist of a diode rectifier connected in association with a dropping resistor which lowers the input voltage to approximately 12 volts. Other components are conventionally used to insure a stable power supply for the control system.

Figure 3:
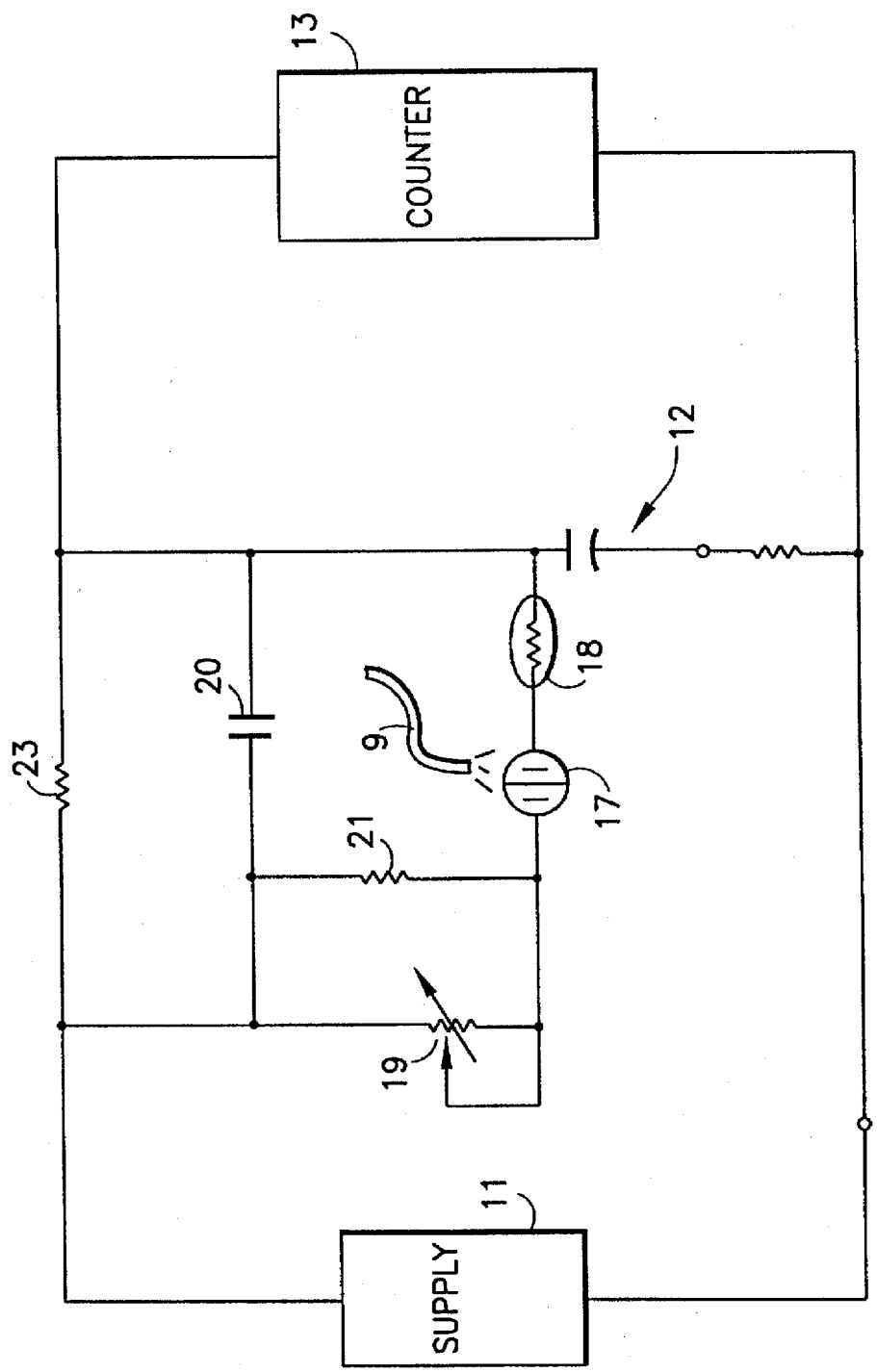
FIG. 3 is a circuit diagram of the RC oscillator network of this invention.

Oscillator 12 is shown in FIG. 3 and consists of an RC network including variable resistor 19, resistors 21 and 23, capacitor 20, light sensitive resistor 17 and heat sensitive resistor 18. It can be seen that changing the resistance of any of the resistors of the RC circuit will adjust the time constant of the RC network and the frequency of the oscillator 12. Variable resistor 19 provides the manual adjustment capability of toaster 1 and generally is a potentiometer which is varied in resistance by the rotation of an external knob 6 as shown in FIG. 1. The operator of the toaster sets the knob 6 at what he or she perceives as the proper time for toast of the desired color. If no other control was provided toasting would be a trial and error process and would vary considerably from cycle to cycle. Two additional elements are provided which react to the functioning of the toaster by sensing the heat within the toast compartment 24 and the intensity of light being emitted from the heating elements 4.

Heat sensitive resistor 18 is positioned to receive heat radiated from the toast compartment 24. The resistance of resistor 18 will decrease as the heat to which it is exposed increases. Since the frequency of the oscillator 12 is inversely proportional to the resistance of the network, the frequency goes up as the resistance goes down. This results in the shortening of the time in which the heater elements are energized as the accumulated heat in the toast compartment 24 increases.

Light sensitive resistor 17 receives light transmitted through the glass pipe 9. The resistance of the resistor 18 decreases as the light intensity to which it is exposed increases. Similarly to the resistor 18, this results in the shortening of the time in which the heater elements 4 are energized as the brightness of the light discharged by the heater element increases.

Figure 4:
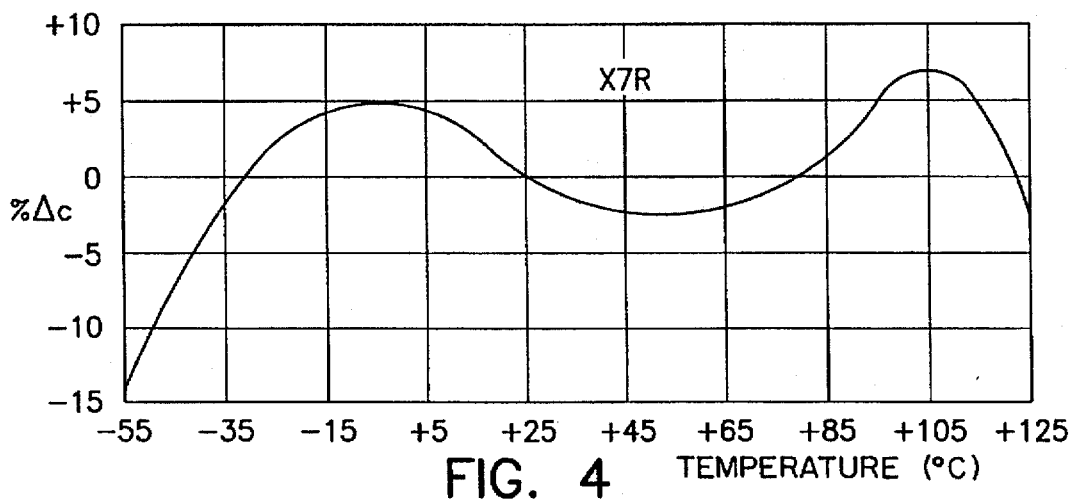
FIG. 4 is the characteristic curve of the capacitor used in the RC network of this invention.

Capacitor 20 is selected to minimize the effects of heat on the capacitance of the RC network. In particular a capacitor having a characteristic temperature curve as shown in FIG. 4 is used, for example, a Philips. Components monolithic ceramic capacitor model no. X7R. This aids in the stabilization of the RC network over the temperature operation range and avoids counter productive variations in capacitance which may negate the effectiveness of the resistor compensation.

Counter 13 is a conventional integrated circuit, for example model CD4060B manufactured by National Semiconductor, and serves to count a predetermined number of cycles of the oscillator 12. When the desired number of cycles are complete, the counter 13 will signal transistor switching circuit 14. The counter signal causes the transistor switch to conduct and energize the solenoid switch 15. This will shut off the heater elements 4 and end the toasting cycle.

The adjustment and compensating resistances must be balanced so as to prevent an over compensation occurring because of the response of any one component. With this in mind, a heat sensitive resistor 18 having a resistance of 100,000 ohms is selected in association with a light sensitive resistor 17 that operates in a range of 4000 to 1100 ohms. The manual adjustment potentiometer 19 is selected having a range of operation of 0 to 100,000 ohms. Capacitor 20 is selected having a capacitance of 0.22 microfarads.

In operation the toast is inserted into the toaster slots 2 and 3 and the knob 6 is manually adjusted to the desired toasting cycle duration thereby energizing the heating elements 4 to begin toasting. The initial cycle will generally be the longest, running in the vicinity of 4minutes, because there is no accumulated heat. The challenge is to repeat the same performance in subsequent operations. A second user then immediately inserts a second pair of bread slices into the toaster and initiates operation of the heating elements 4. At this point, there is considerable residual heat in the toast compartment 24, so a second 4 minute cycle will burn or over cook the toast. Partial compensation will be accomplished by the heat sensitive resistor 18, but by itself this may create an over compensation which results in very light, under done toast. It is desired to reduce the subsequent cycle to approximately 2 to 3 minutes. The heating elements 4 will obtain a higher temperature and a brighter light signature because of the increased heat in the toast compartment 24. The light sensitive resistor 17 will respond by reducing its resistance and a further increase in the frequency of the oscillator 12 will occur. Further cycles will be accelerated at a lesser rate and a reliable toasting performance results.

In this manner compensation is provided for accumulated heat in the toast compartment and for variations in the line voltage.

I claim:

1. In an appliance for toasting bread or other pastries by the energization of heater elements within a toasting compartment, a control system for controlling the duration of the toasting cycle comprising:

a power supply for converting line voltage to a low voltage suitable for providing power to the components of the control system;

an RC network connected to the power supply for generating an oscillating signal used to time the duration of the toasting cycle;

a counter connected to receive the oscillating signal and to generate a switching signal upon counting a predetermined number of oscillations;

a transistor switch connected to turn off the toasting cycle in response to the switching signal;

said RC network having a compensating circuit for varying the frequency of the oscillating signal further comprising:

a manually adjustable resistor for setting the duration of the toasting cycle by the operator;

a heat sensitive resistor responsive to the heat present in the toast compartment to increase the frequency of the oscillating signal;

a light sensitive resistor responsive to the light emitted from the energized heater elements to increase the frequency of the oscillating signal; and means operatively associated with the heater elements to collect light emitted thereby and transmit said light to the light sensitive resistor.

2. In an appliance for toasting bread or other pastries by the energization of heater elements within a toasting compartment, apparatus for controlling the duration of the toasting cycle as described in claim 1 wherein the compensating circuit further comprises a capacitor having a stable operational response over the temperature operating range of the toaster to minimize the effect of varying temperatures on the compensating circuit.

3. In an appliance for toasting bread or other pastries by the energization of heater elements within a toasting compartment, apparatus for controlling the duration of the toasting cycle as described in claim 2 wherein the operational response of the capacitor varies only in the range of −10% to +10%.

4. In an appliance for toasting bread or other pastries by the energization of heater elements within a toasting compartment, apparatus for controlling the duration of the toasting cycle as described in claim 1 wherein the means for collecting and transmitting light from the heating elements comprises a high temperature glass pipe positioned near the heating elements and extending to the light sensitive resistor.

5. A method of controlling the duration of the toasting cycle of an electric toaster having heating elements within a toasting compartment and wherein the time is set by the frequency of the output signal of an RC network comprising the steps of:

establishing an initial toasting cycle through manual adjustment of the resistance of the RC network;

varying the frequency of the output signal of the RC network in response to the heat in the toasting compartment through the use of a heat sensitive resistor; and varying the frequency of the output signal of the RC network in response to the intensity of the light emitted from the heating elements.

6. A method of controlling the duration of the toasting cycle of an electric toaster having heating elements within a toasting compartment and wherein the time is set by the frequency of the output signal of an RC network as described in claim 5 further comprising the step of collecting light emitted by the heating elements and transmitting the light to the light sensitive resistor.

7. A method of controlling the duration of the toasting cycle of an electric toaster having heating elements within a toasting compartment and wherein the time is set by the frequency of the output signal of an RC network as described in claim 5 further comprising the step of maintaining the capacitance of the RC network substantially stable to avoid adverse effects of temperature.

* * * * *